(12) United States Patent
Doerne et al.

(10) Patent No.: US 11,794,634 B2
(45) Date of Patent: Oct. 24, 2023

(54) DRIVER ASSISTANCE SYSTEM AND METHOD

(71) Applicant: Ford Global Technologies, LLC, Dearborn, MI (US)

(72) Inventors: Gerald Doerne, Cologne (DE); Vincent Jannick Frisch, Cologne (DE); Maximilian Bereck, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/935,622

(22) Filed: Sep. 27, 2022

(65) Prior Publication Data

US 2023/0100739 A1 Mar. 30, 2023

(30) Foreign Application Priority Data

Sep. 30, 2021 (DE) .......................... 102021125348.9

(51) Int. Cl.
*B60Q 1/14* (2006.01)
*H05B 47/115* (2020.01)

(52) U.S. Cl.
CPC ......... *B60Q 1/1423* (2013.01); *H05B 47/115* (2020.01); *B60Q 2300/05* (2013.01); *B60Q 2300/42* (2013.01)

(58) Field of Classification Search
None
See application file for complete search history.

(56) References Cited

U.S. PATENT DOCUMENTS

| | | | | |
|---|---|---|---|---|
| 6,990,401 B2* | 1/2006 | Neiss | ............... | B60W 50/0097 701/96 |
| 2016/0288699 A1* | 10/2016 | Solar | ..................... | B60W 30/14 |
| 2017/0308094 A1* | 10/2017 | Abe | ...................... | G08G 1/0968 |
| 2018/0075745 A1* | 3/2018 | Buburuzan | ............ | G08G 1/162 |
| 2018/0281785 A1* | 10/2018 | Berntorp | ................ | G08G 1/167 |
| 2019/0088133 A1* | 3/2019 | Alieiev | .................. | G08G 1/166 |
| 2020/0200896 A1 | 1/2020 | Shan | | |
| 2020/0327809 A1* | 10/2020 | Ji | ........................... | G08G 1/052 |
| 2021/0409379 A1* | 12/2021 | Hwang | ................. | G06V 10/25 |
| 2022/0041096 A1* | 2/2022 | Arndt | ..................... | B60Q 1/085 |

FOREIGN PATENT DOCUMENTS

| | | |
|---|---|---|
| DE | 102006055908 A1 | 5/2008 |
| DE | 102018211259 A1 | 1/2020 |

OTHER PUBLICATIONS

German Search Report as issued by the German Patent Office dated Feb. 10, 2022 (in German).

* cited by examiner

*Primary Examiner* — Wilson Lee
(74) *Attorney, Agent, or Firm* — Frank A. MacKenzie; Bejin Bieneman PLC

(57) ABSTRACT

In order to provide an enhanced driver assistance system for a vehicle, a prediction of a movement of the third-party vehicle is determined based upon motion data relating to a third-party vehicle travelling in front which has moved out of a region of view of at least one sensor of the vehicle, or relating to an oncoming third-party vehicle which has not yet entered the region of view of the sensor, and based upon map data. The driver assistance system is then operated on the basis of the prediction.

15 Claims, 2 Drawing Sheets

DRIVER ASSISTANCE SYSTEM AND METHOD

CROSS-REFERENCE TO RELATED APPLICATIONS

This patent application claims priority to German Patent Application No. 102021125348.9, filed Sep. 30, 2021, which is hereby incorporated by reference in its entirety.

BACKGROUND

The present disclosure relates to a method for operating a driver assistance system of a vehicle. The present disclosure also relates to a driver assistance system for a vehicle, having at least one sensor for capturing motion data from a third-party vehicle that is travelling in front and/or oncoming, and at least one electronic analysis unit.

Modern vehicles are equipped with various driver assistance systems in order to be able to support a driver. A disadvantage of the current driver assistance technologies is the limited range of the sensors, for instance radar sensors, lidar sensors, cameras and the like, and the restriction of the sensors in use to their line of sight or range of their region of view. Technologies such as vehicle-to-vehicle (V2V) communication, for example, are currently deployed to get around these constraints. This only works, however, if other road users and/or the infrastructure are/is also equipped with corresponding vehicle-to-vehicle communication modules.

US 2020/200 896 A1 relates to an automatic driver assistance device of a vehicle that uses a digital lidar map to allow a self-driving vehicle to make a sharp turn around, or pass by, an environmental obstacle.

A predictive cruise control system according to U.S. Pat. No. 6,990,401 B2 utilizes information about the current vehicle position and upcoming terrain to save fuel and increase driving comfort. A vehicle operating function is defined based on a plurality of environmental parameters, vehicle parameters, vehicle operating parameters and route parameters. As the vehicle travels over a particular route for which route parameters, such as road gradient and curvature, are stored in a road map, sensors aboard the vehicle detect environmental and vehicle operating parameters, including at least the vehicle speed and its position relative to the road map. As the vehicle proceeds, an on-board computer iteratively calculates and stores in a memory, vehicle control parameters that optimize the vehicle operating function for a predetermined prediction horizon along the route ahead of the vehicle. The optimal vehicle control parameters for the prediction horizon are then stored in a memory, and are continuously updated and replaced by new data as the vehicle proceeds, whereby the "optimal" control parameters are adjusted to reflect the actual operating history experienced by the vehicle during the journey.

SUMMARY

One or more implementations of the present disclosure provide an enhanced method for operating a driver assistance system for a vehicle, and/or provide an enhanced driver assistance system.

The present disclosure relates to a method performed buy a vehicle with a driver assistance system in which, on the basis of motion data relating to a third-party vehicle travelling in front of the vehicle that has moved out of a region of view of at least one sensor of the vehicle, or relating to an oncoming third-party vehicle which has not yet entered the region of view of the sensor, and on the basis of map data, a prediction of a movement of the third-party vehicle is determined, and the driver assistance system is operated on the basis of the prediction.

DETAILED DESCRIPTION

Figure 1:
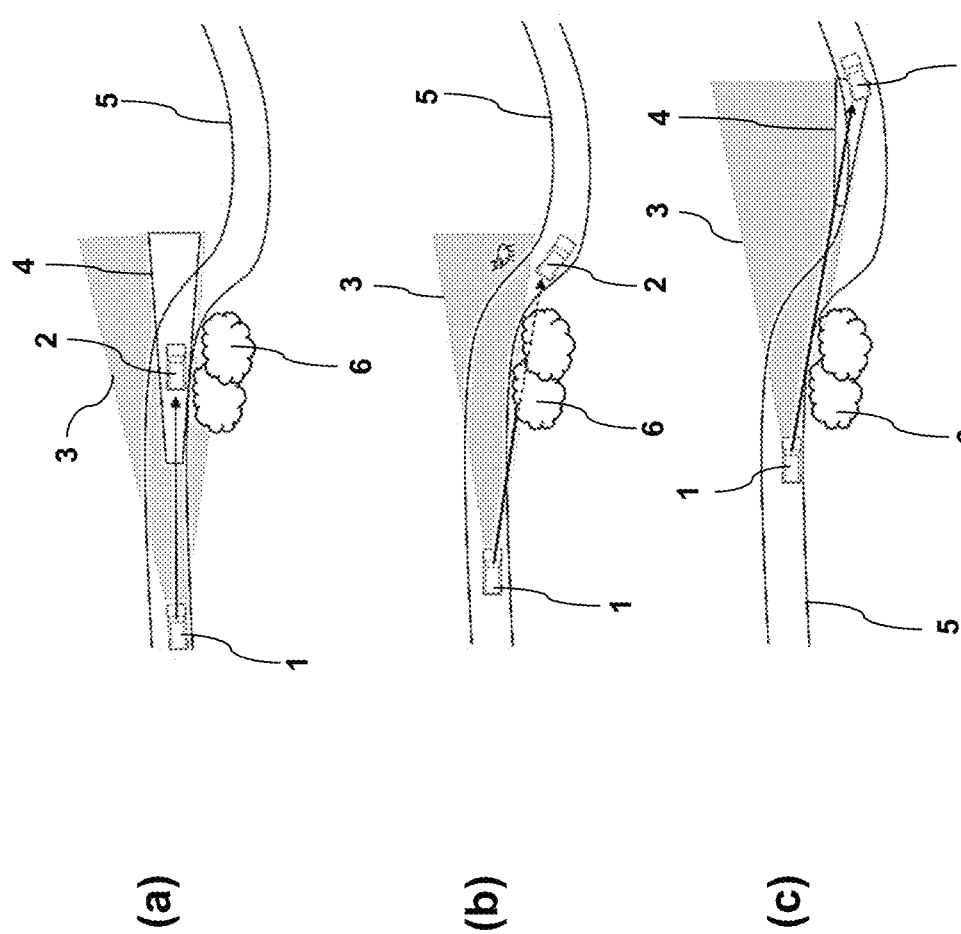
FIG. 1 is a schematic diagram of an exemplary embodiment of a method according to the present disclosure at times (a), (b), and (c).

It should be pointed out that the features and measures mentioned individually in the following description can be combined with one another in any technically sensible way to disclose further embodiments of the invention. The description additionally characterizes and specifies the inventive concepts in association with the figures.

The method according to the present disclosure in a sense extends the range of the sensor data of at least one sensor of the vehicle and/or of the driver assistance system beyond the visibility range of the sensor by predicting, on the basis of existing data and the map data, a movement of a third-party vehicle located outside the region of view of the sensor. The operation of the driver assistance system can then take into account the predicted movement of the third-party vehicle, even though the third-party vehicle is not currently visible to the sensor.

For example, a virtual or digital object can be created for each third-party vehicle, specifically can be created on the basis of sensor data that has been captured by means of the at least one sensor of the vehicle when the particular third-party vehicle was still located in the region of view of the sensor. These virtual objects can then be transferred into a virtual environment map, which can be created on the basis of map data. This allows a prediction of the movements of the particular third-party vehicle, in particular because in most situations there are only a limited number of possible roadways for the vehicle and the particular third-party vehicle. As a result, for a driver assistance system, a third-party vehicle, for example, that disappears from the region of view of the sensor behind a bend will not disappear suddenly for the driver assistance system, but instead the driver assistance system can estimate or assume, and take into account, that the third-party vehicle is highly likely to continue to follow its route.

This is particularly expedient for light-based driver assistance functions, for instance the glare-free high beam, in which a dimmed region inside the high-beam pattern is produced around another road user, while the rest of the surroundings are still illuminated by the remainder of the high-beam pattern. These functions have to detect third-party vehicles from long distances, with a high risk that an object located between the vehicle and the third-party vehicle, for instance an object such as a traffic sign, trees, rocks, billboards, the road structure itself or the topography, affects a line of sight or visibility range of the sensor of the vehicle, causing reactivation of the high beam. A driver who operates the high beam manually could predict this and expect a third-party vehicle to come into his line of sight or his region of view again at a certain point in time. In order to avoid jittery light movements, or the deactivation and reactivation of the high beam, current driver assistance systems can only implement timers that hold the high-beam pattern in a particular form for a certain time period.

These problems are solved by the present disclosure because it can be predicted far more accurately when a third-party vehicle will reappear in a region of view of a sensor of the vehicle after it has disappeared from the region of view. The invention also eliminates the need for timer-operated static hold times, which currently prevent maximizing the high-beam illumination of a road. A dimmed region inside a high-beam pattern can be activated shortly before the third-party vehicle re-enters the region of view of the sensor of the vehicle, so that it is possible to prevent the driver of the third-party vehicle being blinded while guaranteeing maximum illumination of the road before the third-party vehicle appears in the region of view of the sensor.

The present disclosure can be used in various situations, for instance if a third-party vehicle has moved behind an obstacle such as a tree, a house, a sign, a crash barrier, a topographical feature, or other object, for example after the third-party vehicle has travelled around a bend. In addition, the present disclosure can also be used in situations in which only unstable or unreliable sensor information is available.

For implementing the concepts of the present disclosure, it is possible to use, for example, a definitive classification for a defined distance/time, definitive data on instantaneous speeds and instantaneous positions of the vehicle and of the third-party vehicle, a known road structure (e.g., from map data), including a prediction performance factor based on the type of road, existing junctions, a position accuracy, topographies, permitted speed limits, road classification, driver profiles, map quality and the like, known obstacles in the region of view of the sensor of the driver assistance system, and live traffic, for instance based on vehicle-to-vehicle communication. With regard to a definitive classification for a certain distance/time it is conceivable that the distance/time that an object is held is very short (for instance shortly before a junction) but can also be very long (for instance on roads without turn-offs).

The motion data relating to a third-party vehicle travelling in front which has moved out of a region of view of at least one sensor of the vehicle, or relating to an oncoming third-party vehicle which has not yet entered the region of view of the sensor, may contain, for example, data on the direction of travel, the driving speed, the position and/or the acceleration of the third-party vehicle. The map data is in digital form and may originate from a navigation system of the vehicle.

The method according to the present disclosure can be implemented for all vehicles equipped with a driver assistance system that uses sensor data bound to the field of view and that has been captured, for instance, by a radar sensor, a lidar sensor, a camera or the like. In particular, the method can be used in conjunction with a driver assistance system that has the glare-free high beam function.

According to one or more implementations, the sensor may generate the motion data relating to the third-party vehicle travelling in front while the third-party vehicle travelling in front is still in the region of view of the sensor. The motion data can thus be captured or measured directly and then processed further.

According to a further implementation, a driving speed of the third-party vehicle may be estimated on the basis of the motion data relating to the third-party vehicle travelling in front and on the basis of the map data. Knowing the driving speed, the last position of the third-party vehicle in the field of view of the sensor, and the map data, allows a very accurate estimate of the current position of the third-party vehicle located outside the region of view of the sensor, and of the time and the region of the re-entry of the third-party vehicle into the region of view of the sensor.

According to another implementation, the motion data relating to the oncoming third-party vehicle may be generated on the basis of vehicle-to-vehicle communication data, which the vehicle has received from the third-party vehicle before the oncoming third-party vehicle has entered the region of view of the sensor. For this purpose, the vehicle and the third-party vehicle must each be equipped with a corresponding vehicle-to-vehicle (V2V) communication module. The motion data relating to the oncoming third-party vehicle is thus not captured directly but is emitted by the third-party vehicle and received by the vehicle, and then processed further by a processor in the vehicle or the driver assistance system.

According to a further implementation, on the basis of the motion data relating to the vehicle, the map data, and the predicted movement of the third-party vehicle, it may be determined at what time instant and in what region of the region of view of the sensor, the third-party vehicle will enter the region of view of the sensor, with this time instant and this region being taken into account in the operation of the driver assistance system. Shortly before this time instant, the driver assistance system may activate or deactivate a certain function in order to enhance the operation or functioning mechanism of the driver assistance system.

According to another implementation, the driver assistance system in the form of a glare-free high beam assistance system may be operated in such a way that the region of the field of view of the sensor, into which region the third-party vehicle will enter the region of view of the sensor, is dimmed before the third-party vehicle enters the region of view of the sensor. The road segment lying in front of the vehicle can thereby be illuminated to the maximum extent until shortly before the time instant at which the third-party vehicle enters the region of view of the sensor of the vehicle. This increases driver vision and reduces headlight glare for the driver of the third-party vehicle.

In one or more implementations of the present disclosure, a driver assistance system for a vehicle has at least one sensor for capturing motion data from a third-party vehicle that is travelling in front and/or oncoming, and at least one electronic analysis unit with a processor, characterized in that the analysis unit is configured with processor-executable instructions to determine on the basis of the motion data relating to a third-party vehicle travelling in front which has moved out of a region of view of the sensor, or relating to an oncoming third-party vehicle which has not yet entered the region of view of the sensor, and on the basis of map data, a prediction of a movement of the third-party vehicle, the analysis unit of which is further configured to determine on the basis of the motion data relating to a third-party vehicle travelling in front which has moved out of a region of view of the sensor, or relating to an oncoming third-party vehicle which has not yet entered the region of view of the sensor, and on the basis of map data, a prediction of a movement of the third-party vehicle.

The advantages mentioned above with reference to the method are correspondingly associated with the driver assistance system. In particular, the driver assistance system can be used to perform the method according to one of the aforementioned implementations or a combination of at least two of these implementations. The sensor may be, for example, a radar sensor, a lidar sensor, or a camera. The driver assistance system may also comprise two or more such sensors. The electronic analysis unit may be a separate module or may be implemented by software instructions and processor(s) in existing vehicle electronics.

According to an implementation, the analysis unit may be configured to generate the motion data relating to the third-party vehicle travelling in front from sensor data of the sensor generated by the sensor while the third-party vehicle travelling in front is still in the region of view of the sensor. The advantages mentioned above with reference to the corresponding implementations of the method are correspondingly associated with this implementation.

According to a further implementation, the analysis unit may be configured to estimate a driving speed of the third-party vehicle on the basis of the motion data relating to the third-party vehicle travelling in front and on the basis of the map data. The advantages mentioned above with reference to the corresponding implementation of the method are correspondingly associated with this implementation.

According to a further implementation, the analysis unit may be configured to generate the motion data relating to the oncoming third-party vehicle on the basis of vehicle-to-vehicle communication data, which the vehicle has received from the third-party vehicle before the oncoming third-party vehicle has entered the region of view of the sensor. The advantages mentioned above with reference to the corresponding implementation of the method are correspondingly associated with this implementation.

According to another implementation, the analysis unit may be configured to determine on the basis of the motion data relating to the vehicle, the map data, and the prediction of the movement of the third-party vehicle, at what time instant and in what region of the region of view of the sensor, the third-party vehicle will enter the region of view of the sensor, and this time instant and this region are taken into account in the operation of the driver assistance system. The advantages mentioned above with reference to the corresponding implementation of the method are correspondingly associated with this implementation.

According to a further advantageous embodiment, the analysis unit is configured, for a driver assistance system in the form of a glare-free high beam assistance system, to dim the region of the field of view of the sensor, into which region the third-party vehicle will enter the region of view of the sensor, before the third-party vehicle enters the region of view of the sensor. The advantages mentioned above with reference to the corresponding embodiment of the method are correspondingly associated with this embodiment.

In the various figures, the same parts are denoted by the same reference signs and hence usually are also described only once.

FIG. 1 shows schematic diagrams of an exemplary embodiment of a method according to the present disclosure for operating a driver assistance system of a vehicle 1 at times (a), (b), and (c), which driver assistance system may be, for example, a glare-free high beam system.

FIG. 1 at time (a) shows a situation in which a third-party vehicle 2 is travelling in front of the moving vehicle 1 on a straight stretch, with the result that at least one sensor of the vehicle 1 generates motion data relating to the third-party vehicle 2 travelling in front while the third-party vehicle 2 travelling in front remains in the region of view of the at least one sensor. The vehicle 1 has switched on a glare-free high beam 3, with the driver assistance system generating a dimmed region 4 inside the high beam 3 to avoid bothering a driver of the third-party vehicle 2 travelling in front with high beam glare. The road 5 being travelled has an S-shaped bend in a road segment in front of the third-party vehicle 2. Trees 6 are located to the right of the third-party vehicle 2 in the drawing plane.

FIG. 1 at time (b) shows a subsequent situation in which the third-party vehicle 3 has disappeared from view of the sensor of the vehicle 1 by going behind the trees 6. In this situation, the high beam would conventionally be reactivated until the third-party vehicle 2 is back in the region of view of the sensor. This reactivation usually takes some time because the response time of the sensor is limited and the entire field of view is evaluated. During this time delay there is a risk that the driver of the third-party vehicle 2 travelling in front is bothered by the high beam. In addition, the driver of the vehicle 1 can be distracted by the repeated light-beam movements during the reactivation and deactivation. Furthermore, the same would occur were the third-party vehicle 2 to disappear behind any other object instead of behind trees 6, for instance behind a crash barrier (not shown), a bridge pier (not shown) or the like.

According to the method according to the present disclosure, a prediction of a movement of the third-party vehicle 2 is determined based on motion data relating to a third-party vehicle 2 travelling in front which has moved out of a region of view of the sensor of the vehicle, corresponding to FIG. 1 at time (b), and based on map data. The driver assistance system is then operated based upon the prediction.

In addition, according to this method, based upon the motion data relating to the vehicle 1, the map data, and the prediction of the movement of the third-party vehicle 2, it is determined at what time instant and in what region of the region of view of the sensor, the third-party vehicle 2 will enter the region of view of the sensor, with this time instant and this region being taken into account in the operation of the driver assistance system. In this case, the driver assistance system is operated in such a way that the region of the field of view of the sensor, into which region the third-party vehicle 2 will enter the region of view of the sensor, is dimmed before the third-party vehicle 2 enters the region of view of the sensor. This is shown in FIG. 1 at time (c).

For this purpose, software of the driver assistance system can first generate a virtual object from the third-party vehicle 2 travelling in front, and then place this virtual object on a virtual map of the environment. When the third-party vehicle 2 travelling in front is travelling around the bend and, corresponding to FIG. 1 at time (b), is behind the example trees 6 and no longer visible, the driver assistance system decides either to keep active the dimmed, i.e. glare-free, region 4 if the virtual object will shortly reappear in the region of view of the sensor, or to deactivate the dimmed region 4. This decision is based on the data relating to the vehicle 1, the position of the virtual object, and the estimated movement thereof on the virtual map. This information can also be used to estimate the time instant at which the third-party vehicle 2, or the corresponding virtual object, returns again into the region of view of the sensor, so that the light in the computed region of the region of view of the sensor, in which the virtual object is expected to appear, can be deactivated shortly before the expected time instant of the reappearance of the virtual object in the region of view of the sensor. This reliably avoids bothering the driver of the third-party vehicle 2 with high beam glare. In addition, the driver of the vehicle 1 is distracted less.

The method can be applied similarly if the range of a sensor of the driver assistance system is too short to detect continuously a third-party vehicle 2 travelling in front. When the sensor is no longer detecting the third-party vehicle 2 travelling in front, the driver assistance system in the form of a glare-free high-beam assistance system may not respond to the third-party vehicle 2. During this time, there is a risk that the high beam of the vehicle 1 will bother the driver of the third-party vehicle 2 travelling in front.

When the sensor is no longer detecting the third-party vehicle 2 travelling in front, the driver assistance system can decide either to keep active the dimmed, i.e. glare-free, region 4 if the environment information rules out that the third-party vehicle 2 disappears completely from the visible road segment ahead, or to reactivate the light in the glare-free, i.e. dimmed, region 4.

Figure 2:
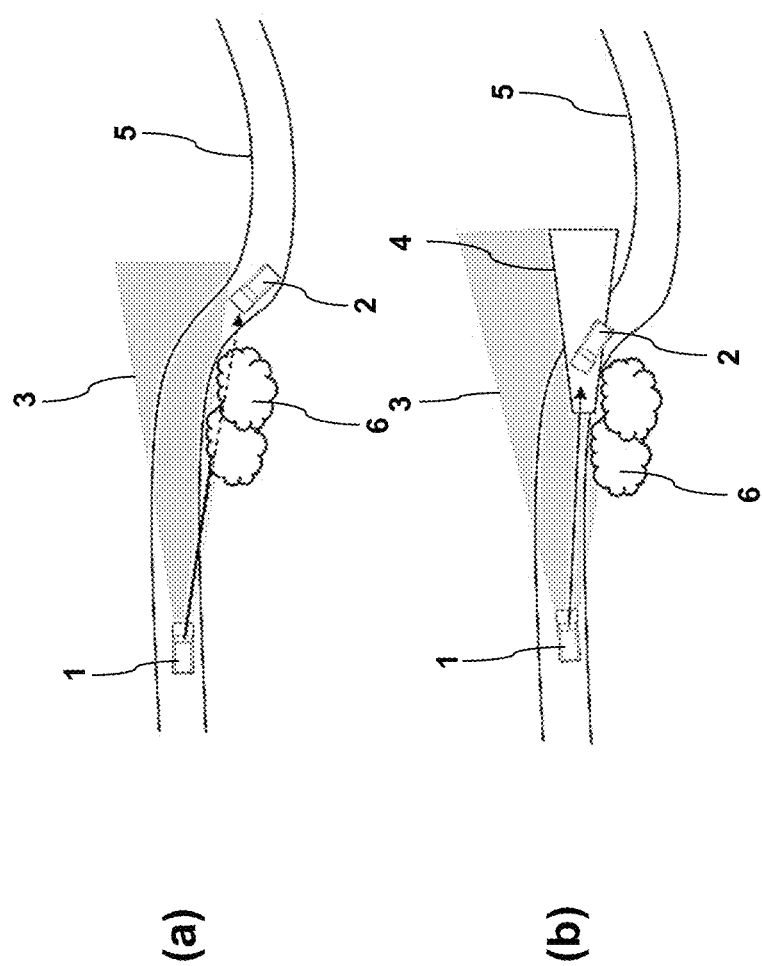
FIG. 2 is a schematic diagram of a further exemplary embodiment of a method according to the present disclosure at times (a) and (b).

FIG. 2 shows schematic diagrams at times (a) and (b) of a further exemplary embodiment of a method according to the invention for operating a driver assistance system of a vehicle 1, which driver assistance system is a glare-free high beam system.

FIG. 2 at time (a) shows a situation in which a third-party vehicle 2 is coming towards the travelling vehicle 1, but is still not in the region of view of the sensor of the vehicle 1 because it is hidden by trees 6. The vehicle 1 has switched on a glare-free high beam 3. The road 5 being travelled has an S-shaped bend in a road segment in front of the vehicle 1.

According to the method, motion data is captured relating to the oncoming third-party vehicle 2 which has not yet entered the region of view of the sensor. The motion data relating to the oncoming third-party vehicle 2 is generated on the basis of vehicle-to-vehicle communication data, which a transceiver in the vehicle 1 has received from the third-party vehicle 2 before the oncoming third-party vehicle 2 has entered the region of view of the sensor.

Based upon the motion data relating to the oncoming third-party vehicle 2 which has not yet entered the region of view of the sensor, and based upon map data, a prediction of a movement of the third-party vehicle 2 is determined, and the driver assistance system is operated on the basis of the prediction. In particular, on the basis of the motion data relating to the vehicle 1, the map data, and the prediction of the movement of the third-party vehicle 2, it is determined at what time instant and in what region of the region of view of the sensor, the third-party vehicle 2 will enter the region of view of the sensor, with this time instant and this region being taken into account in the operation of the driver assistance system. Shortly before this time instant, the driver assistance system generates a dimmed region 4 inside the high beam 3 to avoid bothering a driver of the oncoming third-party vehicle 2 with high beam glare, as shown at time (b) of FIG. 2.

Computers and computing devices generally include computer-executable instructions, where the instructions may be executable by one or more computing devices or processors.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

LIST OF REFERENCES

1 vehicle
2 third-party vehicle
3 high beam
4 dimmed region
5 road
6 tree

The invention claimed is:

1. A method for operating a driver assistance system of a vehicle, comprising:
   obtaining motion data relating to a third-party vehicle travelling in front of the vehicle with at least one vehicle sensor until the third-party vehicle has moved out of a region of view of the at least one sensor of the vehicle, or obtaining motion data of an oncoming third-party vehicle which has not yet entered the region of view of the sensor;
   retrieving map data;
   determining a prediction of a movement of the third-party vehicle based upon the obtained motion data and the map data; and
   operating the driver assistance system based upon the prediction.

2. The method according to claim 1, wherein the at least one vehicle sensor generates the motion data relating to the third-party vehicle travelling in front while the third-party vehicle travelling in front is still in the region of view of the sensor.

3. The method according to claim 2, further comprising estimating a driving speed of the third-party vehicle based upon the motion data relating to the third-party vehicle travelling in front and based upon the map data.

4. The method according to claim 3, wherein the driver assistance system includes a glare-free high beam assistance system.

5. The method according to claim 1, wherein the motion data of the oncoming third-party vehicle is obtained from the third-party vehicle via vehicle-to-vehicle communication, which the vehicle has received from the third-party vehicle before the oncoming third-party vehicle has entered the region of view of the sensor.

6. The method according to claim 5, further comprising:
determining a time instant and a specific region of the region of view that the third-party vehicle will enter the region of view of the at least one sensor based upon the motion data of the third-party vehicle, the map data, and the prediction of the movement of the third-party vehicle; and
operating the driver assistance system based upon the time instant and the specific region where the third-party vehicle will come into view.

7. The method according to claim 6, wherein the driver assistance system includes a glare-free high beam assistance system operated such that the specific region of the field of view of the sensor, where the third-party vehicle will enter the region of view of the sensor, is dimmed before the third-party vehicle enters the specific region of view of the sensor.

8. The method according to claim 1, wherein the driver assistance system includes a glare-free high beam assistance system.

9. A driver assistance system for a vehicle, comprising:
at least one sensor for capturing motion data from a third-party vehicle that is travelling in front of and/or oncoming to the vehicle;
a vehicle-to-vehicle transceiver; and
at least one electronic analysis unit including a processor and a memory, the memory storing instructions executable by the processor programmed to:
determine a prediction of a movement of the third-party vehicle based upon the motion data of the third-party vehicle travelling in front which has moved out of a region of view of the sensor or motion data of an oncoming third-party vehicle which has not yet entered the region of view of the sensor, and based upon map data.

10. The driver assistance system according to claim 9, further comprising instructions to:
generate the motion data of the third-party vehicle travelling in front from sensor data of the at least one sensor generated when the third-party vehicle travelling in front was still in the region of view of the at least one sensor.

11. The driver assistance system according to claim 9, further comprising instructions to:
estimate a driving speed of the third-party vehicle based upon the motion data of the third-party vehicle travelling in front of the vehicle and based upon the map data.

12. The driver assistance system according to claim 9, further comprising instructions to:
generate the motion data of the oncoming third-party vehicle based on vehicle-to-vehicle communication data that the vehicle-to-vehicle transceiver has received from the third-party vehicle before the oncoming third-party vehicle has entered the region of view of the sensor.

13. The driver assistance system according to claim 9, wherein the driver assistance system is a glare-free high beam assistance system.

14. The driver assistance system according to claim 11, wherein the driver assistance system is a glare-free high beam assistance system.

15. The driver assistance system according to claim 12, wherein the driver assistance system is a glare-free high beam assistance system.

* * * * *